US010363730B2

(12) United States Patent
Klein et al.

(10) Patent No.: US 10,363,730 B2
(45) Date of Patent: Jul. 30, 2019

(54) SELECTIVELY ACTIVATED MESH DISCHARGE POWDER RECOATER FOR THREE-DIMENSIONAL PRINTING

(71) Applicant: The ExOne Company, North Huntingdon, PA (US)

(72) Inventors: Andrew P. Klein, Pittsburgh, PA (US); Lawrence J. Voss, Pittsburgh, PA (US); Anthony S. Dugan, McKeesport, PA (US); Michael R. Orner, Dillsburg, PA (US); Thomas Lizzi, Harmony, PA (US)

(73) Assignee: The ExOne Company, North Huntingdon, PA (US)

( * ) Notice: Subject to any disclaimer, the term of this patent is extended or adjusted under 35 U.S.C. 154(b) by 0 days.

(21) Appl. No.: 15/252,375

(22) Filed: Aug. 31, 2016

(65) Prior Publication Data

US 2017/0066190 A1   Mar. 9, 2017

Related U.S. Application Data

(60) Provisional application No. 62/213,942, filed on Sep. 3, 2015.

(51) Int. Cl.
*B29C 64/20* (2017.01)
*B33Y 10/00* (2015.01)
(Continued)

(52) U.S. Cl.
CPC ............ *B33Y 10/00* (2014.12); *B29C 64/153* (2017.08); *B29C 64/20* (2017.08); *B29C 64/205* (2017.08); *B33Y 30/00* (2014.12); *B29C 64/165* (2017.08)

(58) Field of Classification Search
None
See application file for complete search history.

(56) References Cited

U.S. PATENT DOCUMENTS 9,486,962 B1 * 11/2016 Dugan ............... B29C 67/0085
2012/0097258 A1 * 4/2012 Hartmann ............ B28B 1/001
137/14

(Continued)

FOREIGN PATENT DOCUMENTS

WO     WO 95/34468     * 12/1995

*Primary Examiner* — Mary Lynn F Theisen
(74) *Attorney, Agent, or Firm* — Thomas Lizzi

(57) ABSTRACT

Recoaters are described which are adapted for use in powder-layer three-dimensional printers. The recoaters comprise a mesh discharge device that is adapted to be selectively activated by the application of an agitation, e.g. a vibration. Such mesh discharge devices include a planar mesh, i.e. a screen or sieve, which is adapted to support a quantity of powder when the quantity of powder and the mesh are static and to dispense at least a portion of the quantity of powder when at least one of the quantity of powder and the mesh is agitated. Preferably, the mesh is disposed substantially horizontally, but may be disposed at an angle to the horizontal. Also described are powder-layer three-dimensional printers comprising such recoaters. In some embodiments, the powder-layer three-dimensional printers are adapted to space the mesh no more than about two to ten powder layer thicknesses from the top surface of the powder bed or substrate upon which a powder layer is to be deposited.

17 Claims, 7 Drawing Sheets

(51) Int. Cl.
  *B33Y 30/00*      (2015.01)
  *B29C 64/153*     (2017.01)
  *B29C 64/165*     (2017.01)
  *B29C 64/205*     (2017.01)

(56) References Cited

U.S. PATENT DOCUMENTS

2013/0000553 A1*  1/2013  Hoechsmann .......... B05C 19/04
                                               118/708
2014/0065194 A1*  3/2014  Yoo .................... B29C 67/0081
                                               424/400
2016/0311164 A1*  10/2016  Miyano .................. B05D 1/12

* cited by examiner

SELECTIVELY ACTIVATED MESH DISCHARGE POWDER RECOATER FOR THREE-DIMENSIONAL PRINTING

CROSS-REFERENCE TO OTHER APPLICATIONS

This application claims the benefit of U.S. provisional patent application Ser. No. 62/213,942, filed Sep. 3, 2015, by the present inventors.

BACKGROUND

Field of the Invention

The present invention relates to powder recoaters adapted for use in three-dimensional printing having a selectively activated mesh discharge device and three-dimensional printers having such powder recoaters.

Background of the Art

There are today various types of three-dimensional printers, i.e. devices that convert electronic representations of three-dimensional articles into the articles themselves by the systematic building-up of one or more materials. The device of the present invention finds particular utility with the types of three-dimensional printers which create three-dimensional articles by selectively binding together preselected areas of successively deposited layers of powder. These types of three-dimensional printers are referred to herein as "powder-layer three-dimensional printers" because the construction of the three-dimensional article by such printers utilizes layers of powders as a build material. Examples of such types of powder-layer three-dimensional printers include, without limitation, the binder-jet three-dimensional printers, the selective sintering three-dimensional printers, and the electron beam melting three-dimensional printers.

It is to be understood that the term "powder" is also sometimes referred to in the art as "particulate material" or "particles" and the term "powder" is to be construed herein as meaning any such material, by whatever name, that is used in such three-dimensional printers as a layer-forming material. Powder may comprise any type of material capable of taking on the powder form, e.g. metal, plastics, ceramics, carbon, graphite, composite materials, minerals, etc., and combinations thereof. The term "build powder" is used herein to refer to a powder which is used to form the powder layers and from which the article is built in a powder-layer three-dimensional printer.

During the operation of a powder-layer three-dimensional printer, a first layer of a build powder is deposited upon a vertically indexible build platform and then successive powder layers are deposited one at a time upon the first powder layer. Selected portions of selected powder layers are treated to bind the powders in those portions together as one or more three-dimensional articles are formed. Collectively, the portions of the deposited powder layers which are not bound together are referred to herein as a "powder bed."

The process of forming a powder layer is sometimes referred to in the art, and is referred to herein, as "recoating." The device or combination of devices of a particular powder-layer three-dimensional printer that accomplishes the recoating is sometimes referred to in the art, and is referred to herein, as a "powder recoater" or more simply as a "recoater."

In some powder-layer three-dimensional printers, each powder layer is formed by transferring a predetermined quantity of build powder from an open-top stationary powder reservoir by first indexing upward a platform which supports the powder within the reservoir a predetermined amount to raise the predetermined quantity above the reservoir walls and then pushing that quantity of powder across the top of the build platform or the powder bed to form a powder layer.

In some powder-layer three-dimensional printers, each powder layer is deposited upon the build platform or upon an extant powder bed by a recoater comprising a traveling powder dispenser, which may or may not include some device which is adapted to smoothen the top of the powder layer. As used herein, the term "smoothen" is to be interpreted as meaning operating on a quantity of powder so as to do at least one of (a) form at least a portion of the quantity of powder into a layer, (b) make at least a portion of the surface of a layer comprising the quantity of powder less rough, and (c) compress at least a portion of a layer comprising the quantity of powder. A mechanism which smoothens a quantity of powder is referred to herein as a "smoothing device." An example of a recoater having a smoothing device is shown in FIGS. 1A and 1B. Referring to FIG. 1A, there is shown a prior art recoater 2 comprising a bridge section 4 having at its ends first and second trolley mounts 6a, 6b which are adapted to attach the recoater 2 to a pair of parallel trollies (not shown) for selectively moving the recoater 2 across a powder bed (not shown). Referring now to FIG. 1B, there is shown a cross-sectional view of the recoater 2 taken along cutting plane 1B-1B in FIG. 1A. The recoater 2 includes an upper powder reservoir 8, a powder dispensing mechanism 10, and a powder smoothing device in the form of a counter-rotating roller 12. The powder dispensing mechanism 10 comprises a selectively positionable powder metering valve slide 14, a valve throat 16, a powder support plate 18 (sometimes referred to in the art as a "foot"), a lower powder reservoir 19, and an oscillator 20. The lower powder reservoir 19 is mechanically separate from the upper powder reservoir 8 so that the lower powder reservoir 19 can be shaken by the oscillator 20 while the upper powder reservoir 8 remains relatively stationary. During operation, the recoater 2 travels in the direction indicated by the arrow 22 dispensing powder (not shown) from the upper powder reservoir 8 and the lower powder reservoir 19 through the valve throat 16 onto the powder support plate 18 and therefrom onto the powder bed (not shown). For a given powder, the amount of powder dispensed is controlled by regulating the shaking of the powder contained in the lower powder reservoir 19 imparted by the oscillator 20 and the width of the valve throat 16, which is controllably set by the position of metering valve slide 14.

U.S. Pat. No. 5,387,380 to Cima et al. (hereinafter "the '380 Patent") discloses two recoaters which make use of a rotating mesh or screen cylindrical drum. These recoaters are shown schematically in FIGS. 2 and 3, which are reproductions of the '380 Patent's FIGS. 14 and 15, respectively. Referring to FIG. 2, powder is fed from a stationary powder reservoir 170 through an opening, which is controlled by slide gate 173, into a rotating mesh cylindrical drum 165 which is supported within a movable cylindrical housing 161. The size of the mesh of the drum 165 is selected in relation to the size of the powder so that powder is ejected from the drum 165 (and then through the opening 163 in housing 161) only when the drum 165 is rotated. After being supplied with powder from the powder reservoir 170, the housing 161 is moved so as to lay down a bead of powder which is subsequently spread across a powder bed. Referring to FIG. 3, an arrangement is shown in which a sieve drum 171, which is as long as the width of the print region, traverses the print region with rotation across the printing area so as to lay down an essentially uniform powder layer.

Although the recoaters existing in the art today generally work well for their intended purposes, there is room for improvement with regard to recoating speed and for the deposition of fine powders. Even a small increase in speed of the deposition of a single layer becomes significant when multiplied the hundreds or thousands number of layers needed to produce an article or articles in a powder bed. Fine powders are difficult to uniformly spread due to their tendencies to clump together, to have high angles of repose, and to produce powder plumes during recoating.

SUMMARY OF THE INVENTION

The present invention provides recoaters which are adapted for use in powder-layer three-dimensional printers. The inventive recoaters comprise a mesh discharge device that is adapted to be selectively activated by the application of an agitation, e.g. a vibration, as described herein. Such mesh discharge devices include a planar mesh, i.e. a screen or sieve, which is adapted to support a quantity of powder when the quantity of powder and the mesh are static and to dispense at least a portion of the quantity of powder when at least one of the quantity of powder and the mesh is agitated. The term "static" is to be construed herein as meaning that an agitation of sufficient impact, displacement, amplitude, and/or frequency to cause a powder discharge is not being applied to either the mesh or the quantity of powder. Preferably, the mesh is disposed substantially horizontally, but may be disposed at an angle to the horizontal.

In some embodiments, the recoaters also comprise a smoothing device which is adapted to smoothen the powder dispensed by the mesh discharge device. Examples of smoothing devices include rollers, counter-rotating rollers, doctor blades, and tamping platens. In some embodiments the smoothing device is adapted to compact the density of the dispensed powder level a selectable amount.

The present invention also includes powder-layer three-dimensional printers comprising such recoaters. In some embodiments, the powder-layer three-dimensional printers are adapted to space the mesh no more than about two to ten powder layer thicknesses from the top surface of the powder bed or substrate upon which a powder layer is to be deposited.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

FIG. 10A shows the positions of the depicted elements at the start of a recoating step.

FIG. 10B shows the positions of the depicted elements as a portion of the recoater is being moved into position over the powder bed.

FIG. 10C shows the positions of the depicted elements in the powder discharge portion of the recoating step.

FIG. 11A shows positional relationship of the depicted elements prior to the start of a recoating step.

FIG. 11B shows the positional relationship of the depicted elements at the end of the powder dispensing portion of the recoating step.

FIG. 11C shows the positional relationship of the depicted elements during the smoothing portion of the recoating step.

DESCRIPTION OF PREFERRED EMBODIMENTS

Figure 1A:
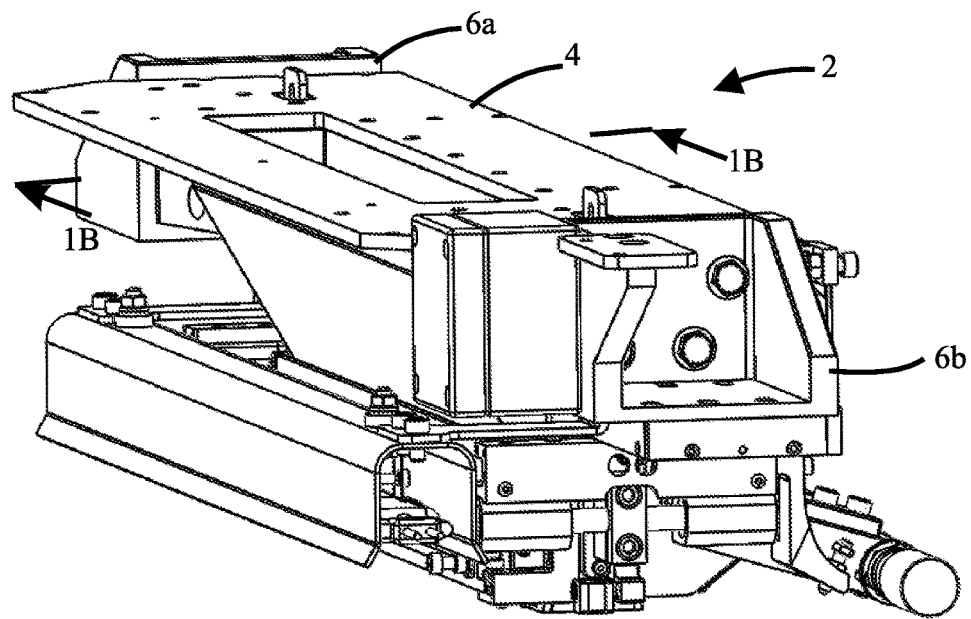
FIG. 1A is an isometric view of a prior art recoater having a powder dispensing mechanism which utilizes a slide valve.
Figure 1B:
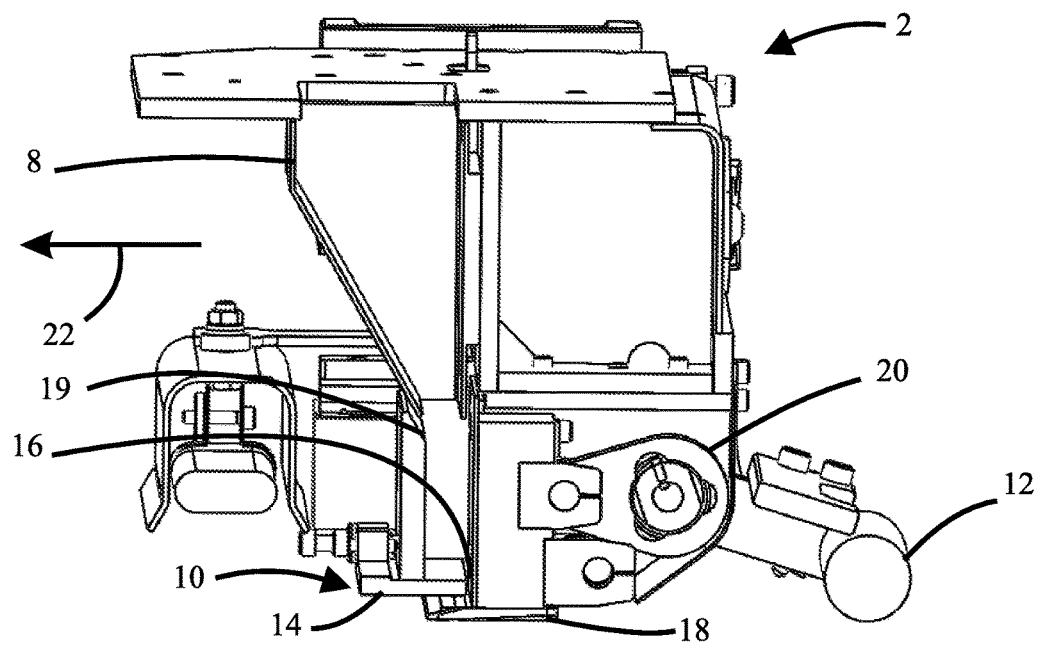
FIG. 1B is an isometric cross-sectional view of the prior art recoater of FIG. 1A sectioned along cutting plane 1B-1B of FIG. 1A.
Figure 2:
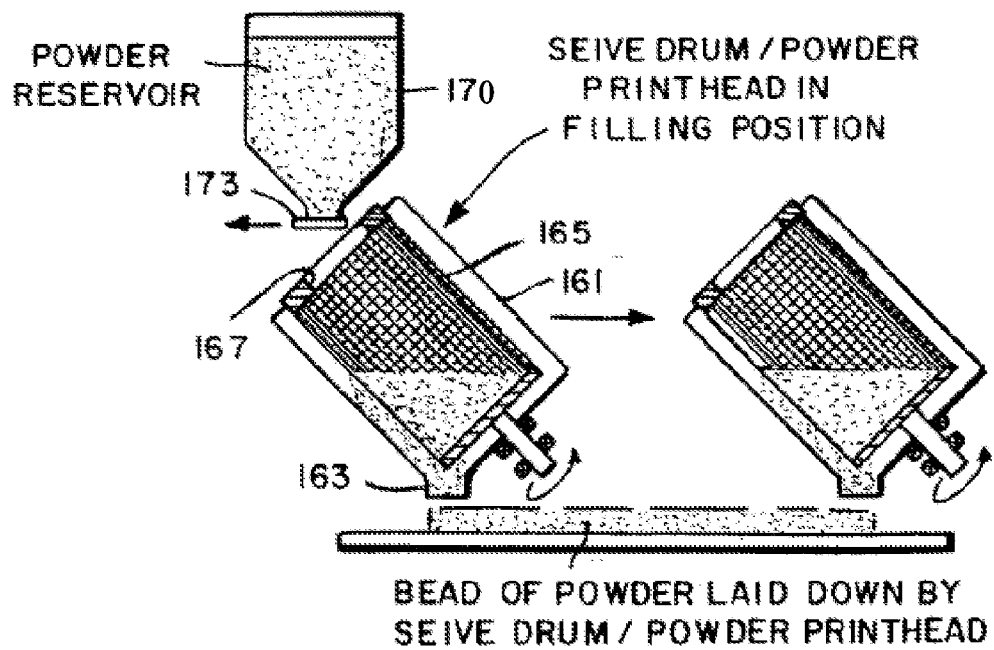
FIG. 2 is a schematic side cross-sectional view of a prior art recoater reproduced from FIG. 14 of U.S. Pat. No. 5,387,380 to Cima et al.
Figure 3:
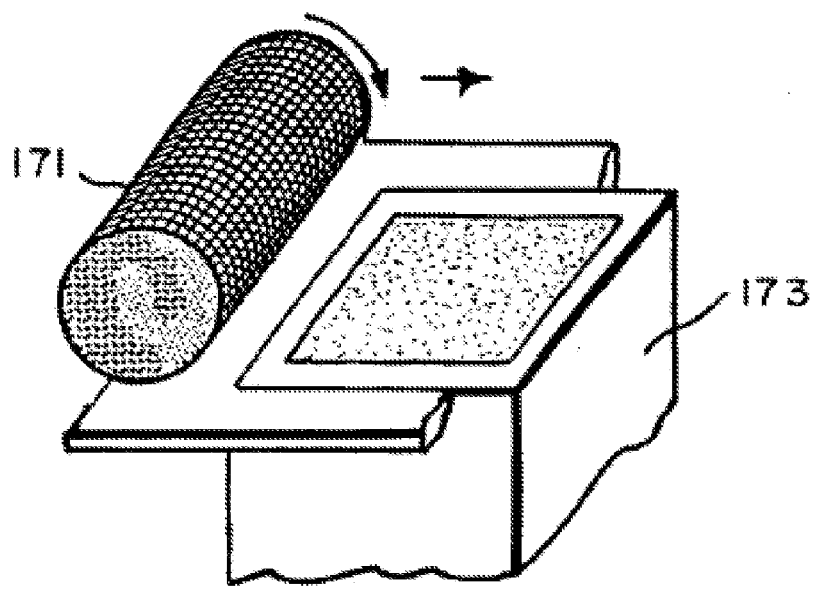
FIG. 3 is a schematic isometric view of a prior art recoater reproduced from FIG. 15 of U.S. Pat. No. 5,387,380 to Cima et al.

Some preferred embodiments of the present invention are described in this section in detail sufficient for one skilled in the art to practice the present invention without undue experimentation. It is to be understood, however, that the fact that a limited number of preferred embodiments are described in this section does not in any way limit the scope of the present invention as set forth in the claims.

It is to be understood that whenever a range of values is described herein, i.e. whether in this section or any other part of this patent document, that the range includes the end points and every point therebetween as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention.

The recoaters of the present invention have particular utility with powder-layer three-dimensional printers. Although the recoaters may be used with any type of powder-layer three-dimensional printers, for the sake of conciseness, the only type of powder-layer three-dimensional printers that will be discussed in this section are those of the binder-jetting three-dimensional printer type. The binder-jetting three-dimensional printers are also sometimes in the art referred to as "three-dimensional inkjet printers" because the binder jetting is done using a print head that resembles those developed for inkjet printing. The basic binder jetting three-dimensional printing process was invented 1980's and developed in the 1990's at the Massachusetts Institute of Technology and is described in several United States patents, including the following United States patents: U.S. Pat. No. 5,490,882 to Sachs et al., U.S. Pat. No. 5,490,962 to Cima et al., U.S. Pat. No. 5,518,680 to Cima et al., U.S. Pat. No. 5,660,621 to Bredt et al., U.S. Pat. No. 5,775,402 to Sachs et al., U.S. Pat. No. 5,807,437 to Sachs et al., U.S. Pat. No. 5,814,161 to Sachs et al., U.S. Pat. No. 5,851,465 to Bredt, U.S. Pat. No. 5,869,170 to Cima et al., U.S. Pat. No. 5,940,674 to Sachs et al., U.S. Pat. No. 6,036,777 to Sachs et al., U.S. Pat. No. 6,070,973 to Sachs et al., U.S. Pat. No. 6,109,332 to Sachs et al., U.S. Pat. No. 6,112,804 to Sachs et al., U.S. Pat. No. 6,139,574 to Vacanti et al., U.S. Pat. No. 6,146,567 to Sachs et al., U.S. Pat. No. 6,176,874 to Vacanti et al., U.S. Pat. No. 6,197,575 to Griffith et al., U.S. Pat. No. 6,280,771 to Monkhouse et al., U.S. Pat. No. 6,354,361 to Sachs et al., U.S. Pat. No. 6,397,722 to Sachs et al., U.S. Pat. No. 6,454,811 to Sherwood et al., U.S. Pat. No. 6,471,992 to Yoo et al., U.S. Pat. No. 6,508,980 to Sachs et al., U.S. Pat. No. 6,514,518 to Monkhouse et al., U.S. Pat. No. 6,530,958 to Cima et al., U.S. Pat. No. 6,596,224 to Sachs et al., U.S. Pat. No. 6,629,559 to Sachs et al., U.S. Pat. No. 6,945,638 to Teung et al., U.S. Pat. No. 7,077,334 to Sachs et al., U.S. Pat. No. 7,250,134 to Sachs et al., U.S. Pat. No. 7,276,252 to Payumo et al., U.S. Pat. No. 7,300,668 to Pryce et al., U.S. Pat. No. 7,815,826 to Serdy et al., U.S. Pat. No. 7,820,201 to Pryce et al., U.S. Pat. No. 7,875,290 to Payumo et al., U.S. Pat. No. 7,931,914 to Pryce et al., U.S. Pat. No. 8,088,415 to Wang et al., U.S. Pat. No. 8,211,226 to Bredt et al., and U.S. Pat. No. 8,465,777 to Wang et al.

For ease of description the powder discharge from the inventive recoaters is described at some places herein in terms of a desired amount of powder. It is to be understood that the present invention includes controlling one or both of the amount of powder discharged from an inventive recoater and the rate at which powder is discharged from the recoater.

Figure 4:
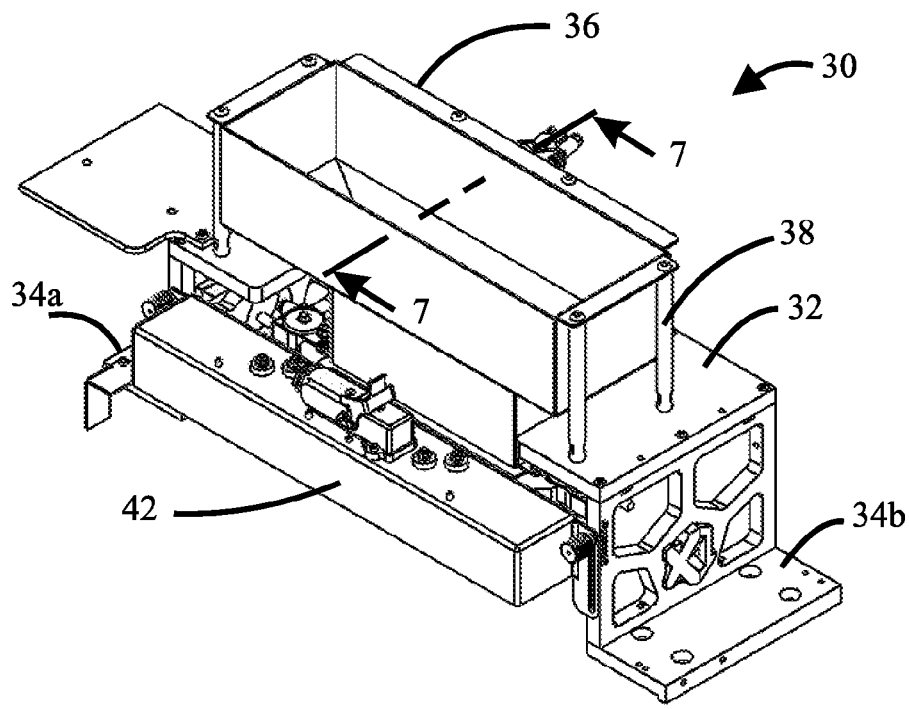
FIG. 4 is an isometric front view of a recoater embodiment.
Figure 5:
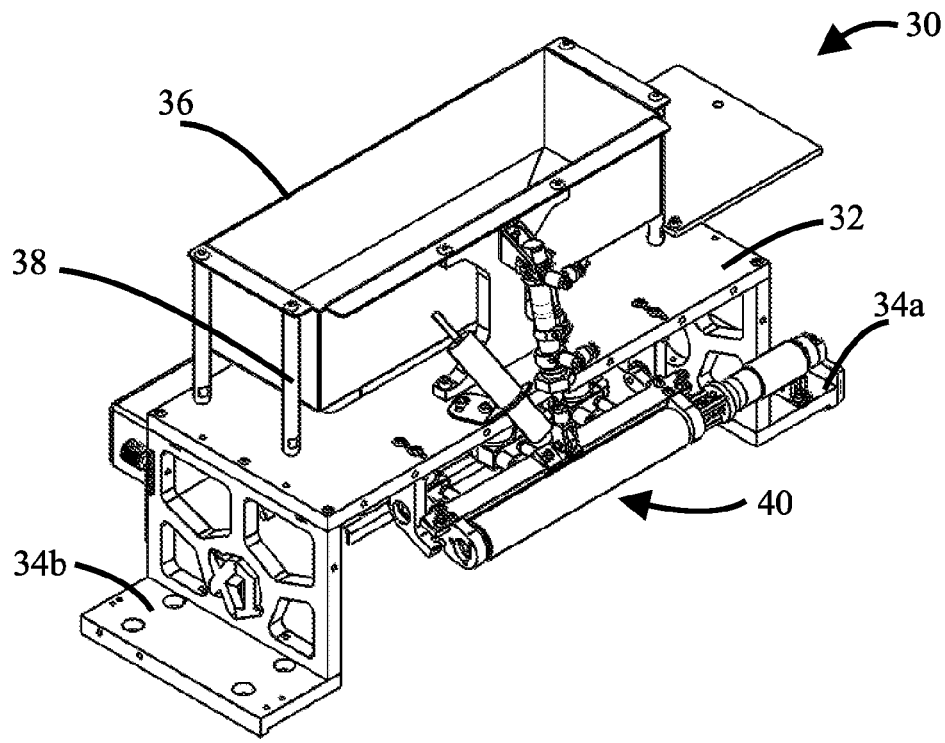
FIG. 5 is an isometric back view of the recoater of FIG. 4.
Figure 6:
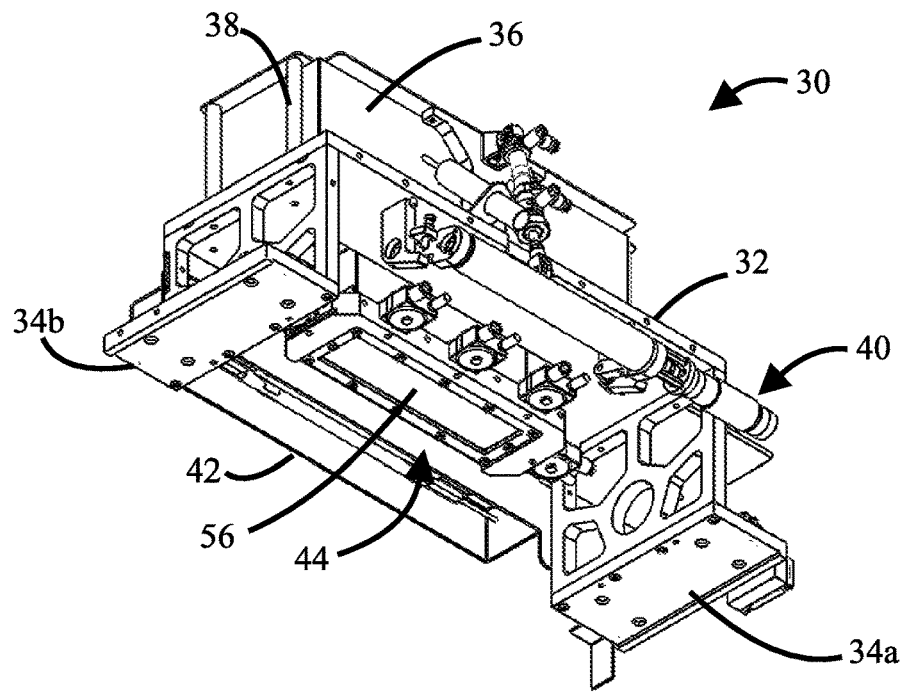
FIG. 6 is an isometric bottom view of the recoater of FIG. 4.

Referring to FIGS. 4-6, there are shown, respectively, front, back, and bottom isometric views of an exemplar embodiment of a powder recoater, i.e. selectively movable recoater 30. The recoater 30 has a bridge section 32 having at its ends first and second trolley mounts 34a, 34b which are adapted to attach the recoater 30 to a pair of parallel trolleys (not shown) for selectively moving the recoater 30 across a powder bed (not shown). The recoater 30 also has a powder reservoir 36 which is adjustably connected to the bridge section 32 by a set of mounting posts, e.g. mounting post 38. The recoater 30 has on its back side a smoothing device in the form of a positionable counter-rotating roller assembly 40 and on its front side a selectively controllable irradiating device in the form of a heat lamp 42. The recoater 30 also includes a mesh discharge device 44, which is best seen in FIG. 7.

Figure 7:
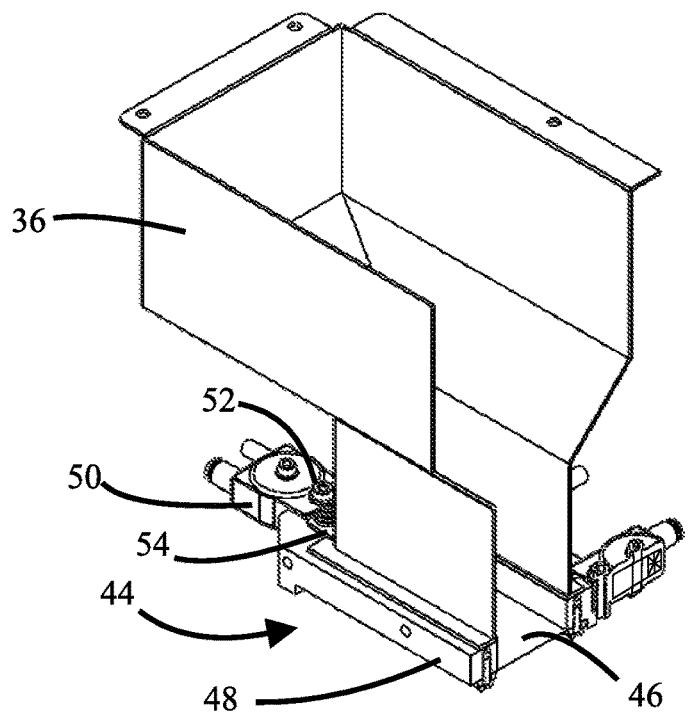
FIG. 7 is an isometric cross-sectional view of a portion of the recoater of FIG. 4 sectioned along cutting plane 7-7 of FIG. 4.

FIG. 7 is a cross-sectional view taken along cutting plane 7-7 in FIG. 4. For clarity, the portions of the recoater 30 other than the powder reservoir 36 and the mesh discharge device 44 have not been included in FIG. 7. The mesh discharge device 44 includes a planar mesh 46, a mesh support frame 48, and a plurality of agitators in the form of a plurality of vibrators, e.g vibrator 50. The mesh support frame 48 is removably attached to the lower portion of the powder reservoir 36. The mesh support frame 48 secures the mesh 46 in place at the bottom opening of the powder reservoir 36 so that during the operation of the recoater 30, the mesh 46 supports the powder contained within powder reservoir 36. The mesh 46 may be permanently or removably attached to the mesh support frame 48. The one or more vibrators are removably attached to the mesh support frame 48. Referring to FIG. 6, the discharge area 56 of the mesh 46 is the portion of the mesh 46 through which powder is discharged during the operation of the mesh discharge device 44.

Figure 8:
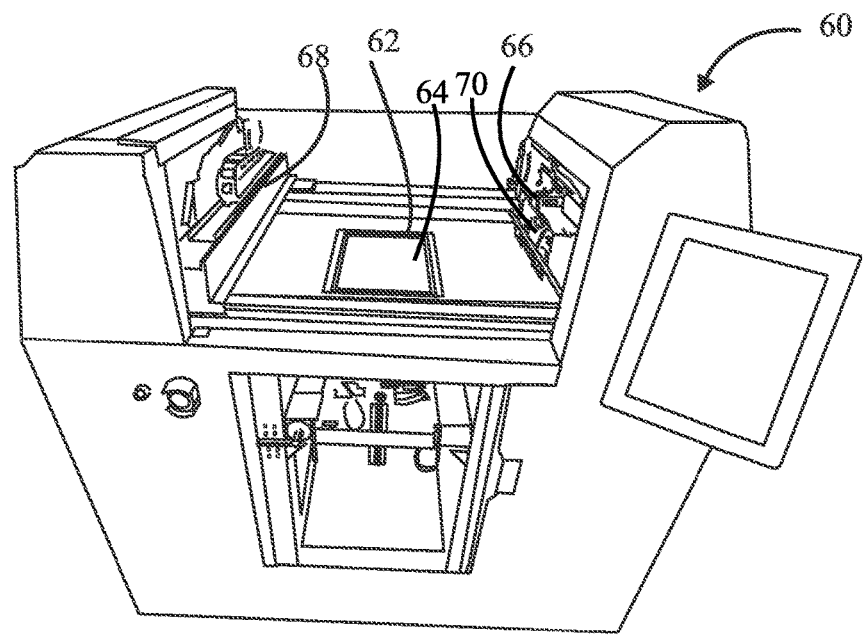
FIG. 8 is a schematic isometric view of a powder-layer three-dimensional printer embodiment.

Referring now to FIG. 8, there is shown a schematic isometric view of an embodiment in the form of powder-layer three-dimensional printer 60. The powder-layer three-dimensional printer 60 includes a removable build box 62 having a vertically indexible platform (not visible) and containing a powder bed 64, a recoater 66, and a selectively positionable binder-jet printing device 68. The recoater 66 is substantially the same as the recoater 30 described above. During operation, the recoater 66 is moved over the powder bed 64 to deposit a powder layer thereupon. This is accomplished by first positioning the recoater 66 so that its mesh discharge device (not visible) is above the powder bed 64 and then sufficiently agitating at least one of the powder that is contained within the powder reservoir of the recoater 66 and the planar mesh of the mesh discharge device to controllably discharge a predetermined amount of powder from the reservoir onto the powder bed and then is moved to a position off to the right of the powder bed 64. If the discharge area of the planar mesh is about the same as the area of the powder bed, then recoater 66 may remain stationary during this discharge, but if the discharge area of the planar mesh is smaller than area of the powder bed, then the recoater 66 may either remain stationary over the leftmost side of the powder bed during the powder discharge or be moved over the surface of the powder during the powder discharge. The powder discharge is terminated by terminating the agitation. As the recoater 66 is moved to a position off to the right of the powder bed 64, the smoothing device 70 of the recoater 66 smoothens the deposited powder to form a uniformly thick powder layer upon the pre-existing top surface of the powder bed 64. Another powder layer may then be deposited, if desired, or the binder-jet printing device 68 may then be moved over the powder bed 64 to selectively deposit binder onto the newly deposited layer and then moved back off to the left of the powder bed 64 to permit the deposition of the next powder layer onto the powder bed 64.

It is preferred that the width of the discharge area of the planar mesh be about the same as that of the powder bed. However, the width of the discharge area of the planar mesh may be less than that of the powder bed. In embodiments in which this is the case, at least one of the recoater and a leveling device is adapted to move across the width of the powder bed so as to form a uniform powder layer across the width of the powder bed. In some such embodiments, the recoater is adapted to dispense powder while moving across the width of the powder bed and/or across its length. In some such embodiments, the smoothing device of the recoater is adapted to move across one or both of the width and the length of the powder bed.

In some preferred embodiments, the discharge area of the planar mesh is substantially the same as the area of the top surface of the powder bed, thus allowing the discharge of an entire powder layer in situ and the lowering of the recoating time.

During powder discharge, the bottom surface of the mesh of the mesh discharge device may be any desired distance above the top surface of the powder bed upon which a powder layer is to be formed. However, when the powder is fine, i.e. having a mean diameter of less than 20 microns, or contains a significant portion of fine powder, it is preferred that the bottom surface of the mesh be spaced a distance equivalent to about two to ten layer thicknesses from the top surface of the powder bed, and more preferably within two to five layer thicknesses, when the discharge is being done over substantially all of the powder bed top surface (as opposed to being discharged in a pile which is subsequently then spread over the powder bed top surface by a smoothing device to form a layer thereupon). Spacing distances below the desired range are less desirable because of the possibilities of the occurrence of one or more of the following conditions: local variations in the height of the powder bed interfering with the local dispensing of powder; local interferences of the device fixing the position of the mesh, e.g. the mesh support frame 48 of FIGS. 4-7, with either the dispensed powder or the top surface of the powder bed; and low packing density of the dispensed powder prior to it being compacted by a smoothing device. Spacing distances greater than the desired range are less desirable because they contribute to pluming of the fine powder during the dispensing operation, i.e. the formation of dust clouds or plumes comprising suspended fine powder.

The desired spacing distance may be obtained by fixing the powder bed top surface and the bottom surface of the mesh in relationship to one another and may be adjusted by moving at least one of the powder bed top surface and the mesh bottom surface in relationship to one another. The vertical location of the powder bed top surface can be selectively fixed or altered by selectively fixing or altering the height of the indexible platform upon which the powder bed is supported. The vertical location of the mesh bottom surface may be permanently or adjustably fixed. A permanent fixation may be accomplished by constructing the recoater in a fashion which locks the bottom surface location and adjustable fixation may be accomplished by constructing the recoater to accommodate shims or other mechanisms for selectively locking the vertical location of the mesh bottom surface. Altering the height of the mesh bottom surface may be accomplished by supporting the structure to which the mesh is directly or indirectly connected, e.g. the powder reservoir, on vertically adjustable elements, e.g. screw jacks or pistons.

Some recoaters embodiments are adapted to discharge a pile of powder which is then spread over the powder bed top surface by a smoothing device to form a powder layer thereupon. Preferably, during the operation of such recoaters with fine powders or powders which contain a significant amount of fines, the spacing between the top of the powder pile and the mesh bottom surface is dynamically maintained during powder discharge to be at a distance which is about 0.1 to about 1 cm from the top surface of the powder pile and more preferably within 0.1 and 0.5 cm, so as to hinder the occurrence of powder pluming.

Although in the embodiment depicted in FIG. 4-7 the mesh is fixed in relation to the bottom opening of the powder reservoir by way of a mesh support frame to which the mesh is attached, it is within the scope of the present invention that the mesh be fixed in such relationship by other means. For example, the mesh may be removably or permanently attached directly to the powder reservoir or to some extension of the powder reservoir, e.g. by way of clamps, fasteners, adhesives, soldering, brazing, or welding or any combination thereof. In instances wherein fasteners are used, the fasteners may or may not perforate the non-discharge areas of the mesh. Regardless of the means by which the mesh is attached to the other components of the recoater, the discharge area of the mesh is to be planar. The term "planar" in this context permits a practicable amount bowing or other curvature taking into consideration the stiffness of the mesh, the thickness of the mesh, the weight of the powder which the mesh supports, and the means of attachment of the mesh to the other components of the recoater. In embodiments which do not employ a mesh support frame to attach the mesh to the rest of the recoater, the mesh discharge device comprises the mesh, the means by which the mesh is attached to other components of the recoater, and one or more agitators.

In some embodiments, one or more isolation devices are used to at least partly mechanically isolate from the rest of the recoater the portion or portions of the recoater to which an agitator or agitators apply the agitation which results in the controlled discharge of powder from the recoater. For example, in the embodiment shown in FIG. 7, vibrators, e.g. vibrator 50, are attached to the mesh support frame 48 to selectively apply an agitation to mesh 46 for the discharge of powder from mesh 46. The mesh support frame 48 is attached to the powder reservoir 36 by a plurality of bolts, e.g. bolt 52, which pass through apertures in the flange 54 of the powder reservoir 36 and a pair of vibration absorbing elastomer washers (not visible) and thread into the mesh support frame 48. The vibration absorbing washers act to mechanically isolate the mesh support frame 48 from the powder reservoir 36 and to the other parts of the recoater to which the powder reservoir 36 is attached.

In embodiments, the recoater has one or more selectively controllable agitators, e.g. vibrator 50 of FIG. 7. Each agitator is positioned and operated to provide a desired amount of mechanical disturbance to at least one of the powder contained within the powder reservoir and the mesh. The net effect of the disturbances provided by the one or more agitators of the mesh discharge device is to controllably cause the discharge of powder through the mesh. Although an agitator is preferably attached to another component of the recoater, e.g. the powder reservoir, the mesh support frame, the bridge, etc., in some embodiments one or more agitators are not physically attached to another component of the recoater but are only functionally connected to at least one of the mesh and the powder in the powder reservoir. Nonetheless, such agitators are to be understood as being a component of the recoater despite the lack of physical attachment.

Figure 9:
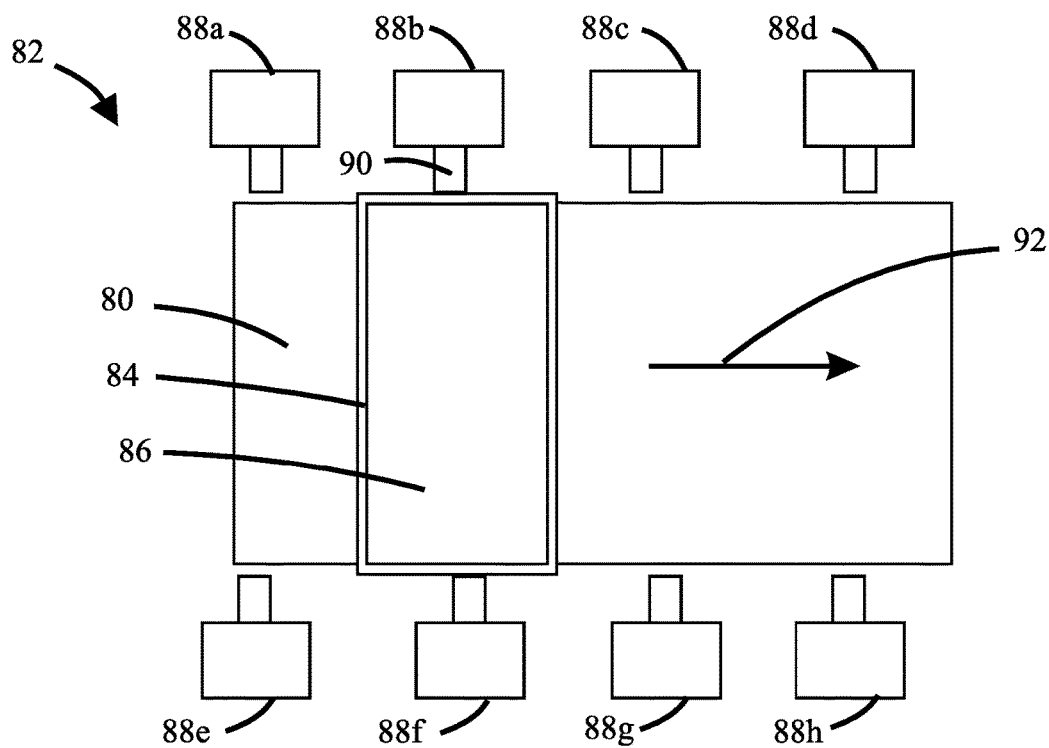
FIG. 9 is a schematic top view of a recoater embodiment in which the agitators of the recoater are not physically attached to the remainder of the recoater.

For example, FIG. 9 shows a schematic top view of a powder bed 80 and a recoater embodiment of which, for ease of description, only the mesh discharge device 82 of which is depicted. The mesh discharge device 82 comprises a mesh support frame 84, a mesh 86, and a plurality of agitators in the form of vibrators 88a-88h which are not physically attached to any of the other components of the recoater. As the recoater moves longitudinally across the powder bed 80 in the direction of arrow 92, the vibrating element of one or more of the vibrators 88a-88h, e.g. vibrating element 90 of vibrator 88b, comes in contact with the mesh support frame 84 thus putting the vibrator in functional connection with the mesh 86 supported by the mesh support frame 84. All of the vibrators 88a-88h may be controlled to operate at the same time or they may be individually controlled such that a particular vibrator is active only during the time in which it is in contact with the mesh support frame 84. Note that one or more of the vibrators 88a-88h may be configured so that when the vibrator is not operating, its vibrating element is in a position which allows the mesh support frame 84 to pass by it untouched.

Figure 10A:
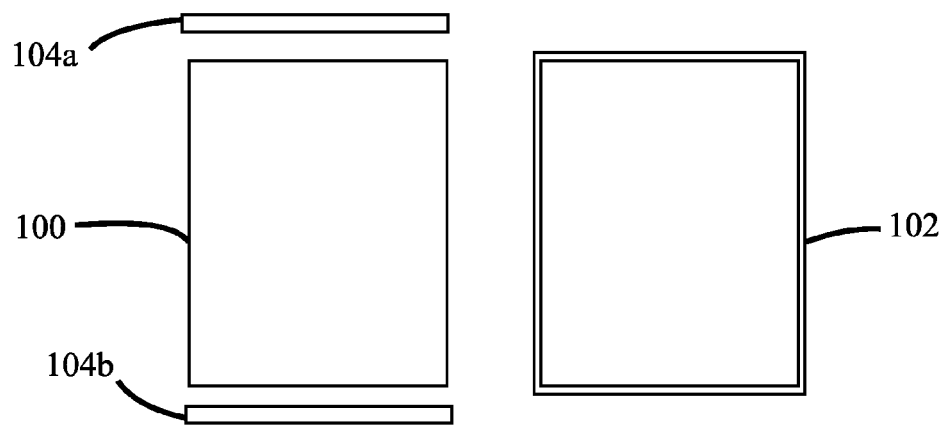
FIGS. 10A-10C are a series of schematic top views of a recoater embodiment in which the agitators of the recoater are not attached to the remainder of the recoater and the discharge area of the recoater mesh is the same as the area of the top surface of the powder bed.
Figure 10B:
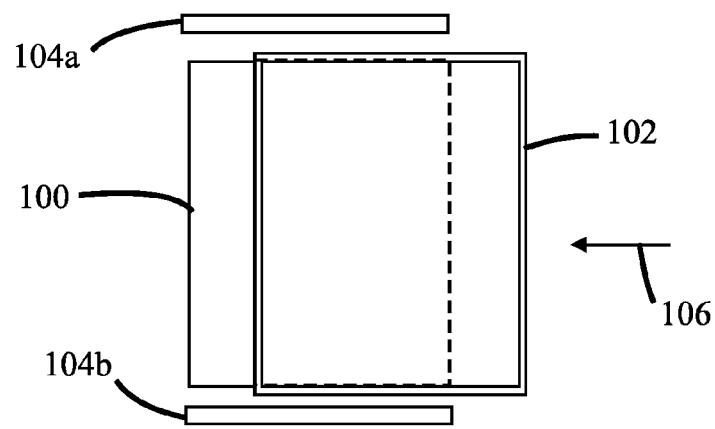
Figure 10C:
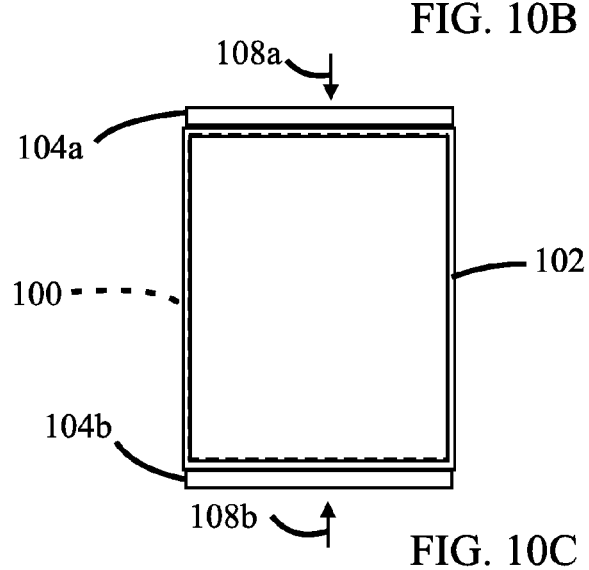

Referring to FIGS. 10A-10C, there is shown a series of three schematic top view drawings for an embodiment wherein, as in FIG. 9, for ease of description only the mesh discharge device of a recoater is shown along with a powder bed 100. The mesh discharge device comprises a mesh contained with a mesh support frame 102 and a set of retractable parallel agitators 104a, 104b. In the embodiment depicted in these figures, the discharge area of the mesh supported by the support frame 102 is substantially the same as the area of the top surface of the powder bed. The FIGS. 10A-10C show a sequence of movement of the support frame 102 and the retractable parallel agitators 104a, 104b during a recoating step in relation to the fixed powder bed 100. FIG. 10A shows the positions of these elements at the start of the recoating step. In FIG. 10B, the support frame 102 can be seen to have moved in the direction indicated by arrow 106 and is partly over the powder bed 100 and the agitators 104a, 104b are in their retracted positions to permit the mesh support frame 102 to pass by them untouched. In FIG. 10C, the support frame 102 can be seen to have been moved so that the discharge area of the mesh is superimposed over the entire powder bed 100 (indicated by dashed lines) and the agitators 104a, 104b have been moved, respectively, in the directions of arrows 108a, 108b so that they functionally connect with the mesh supported by the mesh support frame 102 to permit, when activated, the discharge of powder through the mesh onto the powder bed. After the powder discharge has been completed, the agitators 104a, 104b are withdrawn and the mesh support frame 102 is moved back to its position shown in FIG. 10A.

Agitators may be in the form of any type of device that is controllably capable of providing sufficient disturbance of at least one of the mesh and the powder in the powder reservoir to controllably discharge a desired amount powder from the powder reservoir through the mesh. Vibrators have already been mentioned herein as a type of agitator. Other types of agitators include, without limitation, oscillators which shake at least one of the powder and the mesh, mechanical stirrers or mixers which directly engage the powder within the powder reservoir (or an extension thereof), hammers which impact the powder reservoir (or an extension thereof), the mesh, and/or a mesh support frame, scrapers which scape across at least a portion of the mesh or a corrugated surface functionally connected thereto and/or the powder reservoir (or an extension thereof), and gas jets which impact the powder within the powder reservoir (or extensions thereof) and/or the mesh.

The opening size of the mesh preferably is chosen to suit the powder with which the mesh is to be used. Of course, the opening size must be sufficiently large to permit the passing of the powder particles, but how much larger than this minimum size the opening size optimally should be depends in large part on the physical characteristics of the powder, e.g., the powder shape, surface topology and roughness, density, moisture content, self-attraction or self-repulsion, etc. What is necessary is that the opening size be such that the powder is able to readily bridge across the openings when the mesh is to support a predetermined minimum amount of powder in the powder reservoir and to controllably discharge powder when at least one of the powder and the mesh are agitated.

Figure 11A:
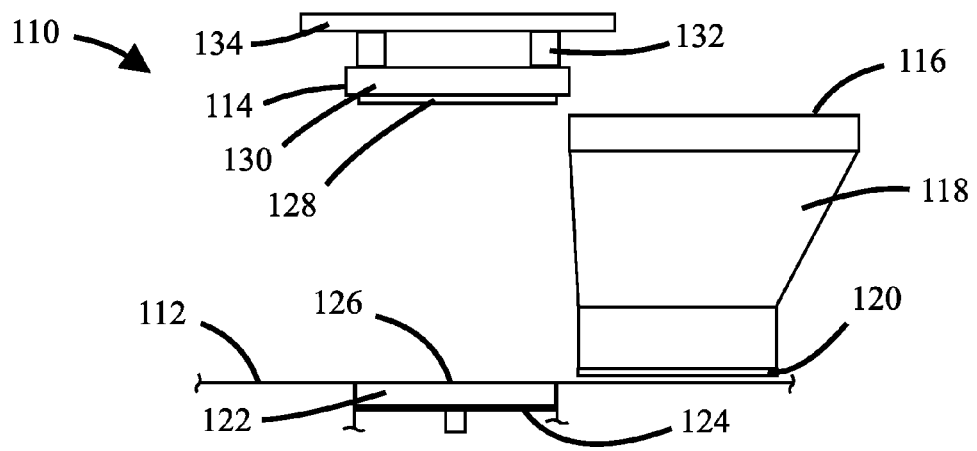
FIGS. 11A-11C are a series of schematic side views of a portion of a powder-layer three-dimensional printer embodiment in which the smoothing device of the recoater is not physically attached to the remainder of the recoater.
Figure 11B:
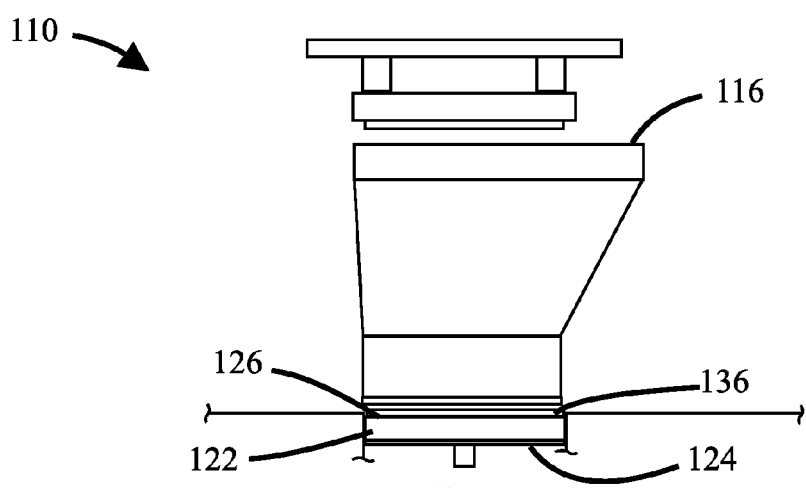
Figure 11C:
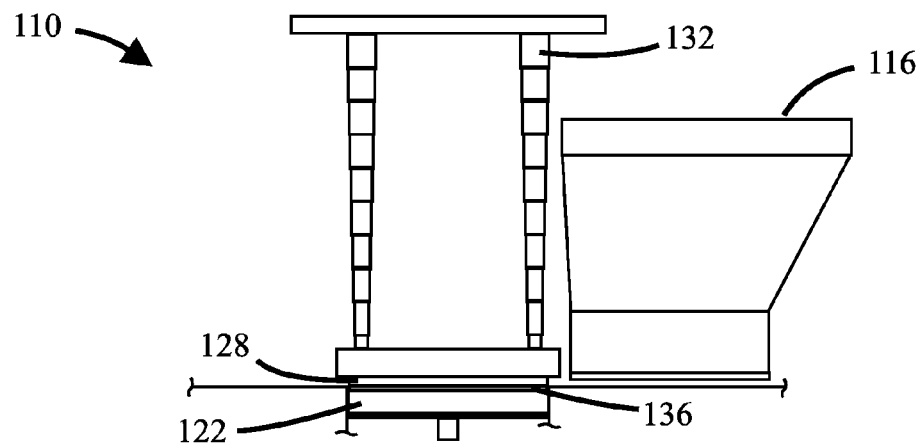

Although in the discussion so far when a smoothing device is present in a powder-layer three-dimensional printer or recoater the smoothing device has been described as being attached to another part of the recoater, it is to be understood that in some embodiments wherein the recoater includes a smoothing device, the smoothing device is not physically attached to another part of the recoater. Such an arrangement permits the movement of the smoothing device to be independent from the movements other parts of the recoater, even though such movements may be coordinated with each other. FIGS. 11A-C schematically depict the operation of a powder-layer three-dimensional printer 110 (only a portion of which is shown) having working deck 112 and in which the smoothing device of the recoater is a tamping platen assembly 114 which is not physically attached to other parts of the recoater, which, for ease of description, are depicted in these figures by a movable powder dispensing assembly 116 comprising a powder reservoir 118 connected to a mesh support frame 120 having a planar mesh (not visible).

FIG. 11A shows the positional relationship of these elements prior to the start of a recoating step. A powder bed 122 is supported upon a vertically indexible build platform 124. The top surface 126 of the powder bed 122 is substantially coplanar with the working deck 112. The tamping platen assembly 114 comprises a platen 128 disposed in a housing 130 in manner which permits the platen 128 to controllably vibrate within the housing 130. The housing 130 is supported by a plurality of telescoping supports, e.g. telescoping support 132, from a structural member 134 of the powder-layer three-dimensional printer 110 at a height above the working deck 112 that permits the powder dispensing assembly 116 to pass under the platen 128 without contacting the platen 128. Note that in this embodiment the discharge area of the mesh and the area of the bottom surface of the platen 128 are the same as the area of the top surface 126 of the powder bed 122, although other relative area dimensions are within the scope of the present invention.

FIG. 11B shows the positional relationship of the elements at the end of the powder dispensing portion of the recoating step. The powder dispensing assembly 116 is positioned over the powder bed 122 so that the mesh is superimposed directly over the powder bed 122. A quantity of dispensed powder 136 sufficient to form a new powder layer has been discharged through the mesh of the powder dispensing assembly 116 substantially uniformly over the top surface 126 of the powder bed 122. Note that the build platform 124 has been lowered to accommodate the dispensed powder 136.

FIG. 11C shows the positional relationships of the elements during the powder smoothing portion of the recoating step. The powder dispensing assembly 116 has been moved off to the right and away from the powder bed 122. The telescoping supports, e.g. telescoping support 132, have been extended to bring the platen 128 into contact with the dispensed powder 136. The platen 128 is controllably vibrated to smoothen the dispensed powder 136 to transform the dispensed powder 136 into a new powder layer of desired thickness and surface smoothness. At the completion of the smoothing portion of the recoating step, the telescoping supports, e.g. telescoping support 132, are retracted to bring the platen 128 back to the position it had in FIG. 11A.

It is also to be understood that in some embodiments in which the recoater includes a smoothing device, the smoothing device may be employed selectively, i.e. only for selected layers and/or only for selected portions of selected layers, or for all layers.

Further, in some embodiments the recoater includes a plurality of smoothing devices. Such smoothing devices may be of the same type or of different types. For example, in some embodiments, the recoater has both an attached smoothing device, e.g. the counter-rotating roller assembly 40 of FIGS. 4-6, and a non-attached smoothing device, e.g. the tamping platen assembly 114 of FIG. 11. In such embodiments, each of the smoothing devices may be individually employed selectively or used for all recoatings. For example, for an embodiment in which the recoater has both an attached smoothing device and a non-attached smoothing device and a discharge area that is the same as the area of the top surface of the powder bed, after the discharge of powder from the recoater onto the powder bed has been completed, the attached smoothing device can smoothen the discharged powder as the dispensing portion of the recoater is moved away from the powder bed and then the non-attached smoothing device can be employed to further smoothen the discharged powder.

While only a few embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

What is claimed is:

1. A recoater comprising a mesh discharge device having a planar mesh and an agitator, the mesh being adapted to support a quantity of powder when the quantity of powder and the mesh are static and to discharge at least a portion of the quantity of powder when at least one of the quantity of powder and the mesh is agitated by the agitator wherein the recoater is adapted for use as a component of a powder-layer three-dimensional printer and wherein the agitator is not physically attached to another part of the recoater.

2. The recoater of claim 1 wherein the mesh is disposed horizontally.

3. The recoater of claim 1 wherein the agitator is a vibrator.

4. The recoater of claim 1 further comprising a smoothing device.

5. The recoater of claim 1 wherein the mesh discharge device also has a mesh support frame and the mesh is attached to the mesh support frame.

6. The recoater of claim 5 further comprising a powder reservoir, wherein the mesh is directly attached to the powder reservoir.

7. A powder-layer three-dimensional printer comprising a recoater, the recoater comprising a mesh discharge device having a planar mesh, the mesh being adapted to support a quantity of powder when the quantity of powder and the mesh are static and to dispense at least a portion of the quantity of powder when at least one of the quantity of powder and the mesh is agitated and wherein the agitator is not physically attached to another part of the recoater.

8. The powder-layer three-dimensional printer of claim 7 wherein the mesh is disposed horizontally.

9. The powder-layer three-dimensional printer of claim 8 wherein the powder-layer three-dimensional printer is adapted to support a powder bed having a top surface, the powder bed comprising at least one powder layer having a thickness, the mesh has a bottom surface, and the recoater is adapted to position the mesh so that the bottom surface of the mesh is spaced about two to ten powder layer thicknesses from the top surface of the powder bed.

10. The powder-layer three-dimensional printer of claim 9 wherein the mesh has a discharge area, the discharge area being substantially the same as the area of the top surface of the powder bed.

11. The powder-layer three-dimensional printer of claim 7 wherein the agitator is a vibrator.

12. The powder-layer three-dimensional printer of claim 7 further comprising a smoothing device.

13. A method of recoating comprising the steps of:
  a) providing a powder-layer three-dimensional printer comprising a recoater, the recoater comprising a mesh discharge device having a planar mesh and an agitator, the mesh being adapted to support a quantity of powder when the quantity of powder and the mesh are static and to dispense at least a portion of the quantity of powder when at least one of the quantity of powder and the mesh is agitated by the agitator and wherein the agitator is not physically attached to another part of the recoater;
  b) positioning at least part of the mesh over at least part of a powder bed;
  c) functionally connecting the agitator to the mesh and discharging from the mesh a predetermined amount of powder upon the powder bed.

14. The method of claim 13 wherein the mesh has a bottom surface and the powder bed has a top surface and comprises at least one powder layer having a thickness, the method further comprising the step of spacing the bottom surface of the mesh a distance from the top surface of the powder bed wherein the distance is in the range of about two to ten powder layer thicknesses.

15. The method of claim 14 wherein the step of spacing includes adjusting the distance by raising or lowering the mesh.

16. The method of claim 13 wherein the mesh has a bottom surface, wherein the step of discharging comprises forming a powder pile having a top, the method further comprising the step of dynamically spacing the bottom surface of the mesh a distance from the top of the pile during the step of discharging to maintain the distance in the range of about 0.1 to about 1.0 centimeters.

17. The method of claim 13 wherein the recoater further comprises a smoothing device which is not physically attached to the remainder of the recoater, the method further comprising the step smoothing the discharged predetermined amount of powder with the smoothing device.

* * * * *